June 3, 1947. G. H. BINGHAM, JR 2,421,679
LIFESAVING BOAT
Filed May 1, 1944 6 Sheets-Sheet 1

Inventor:
George H. Bingham Jr.,
by J. H. O'Grady,
Attorney.

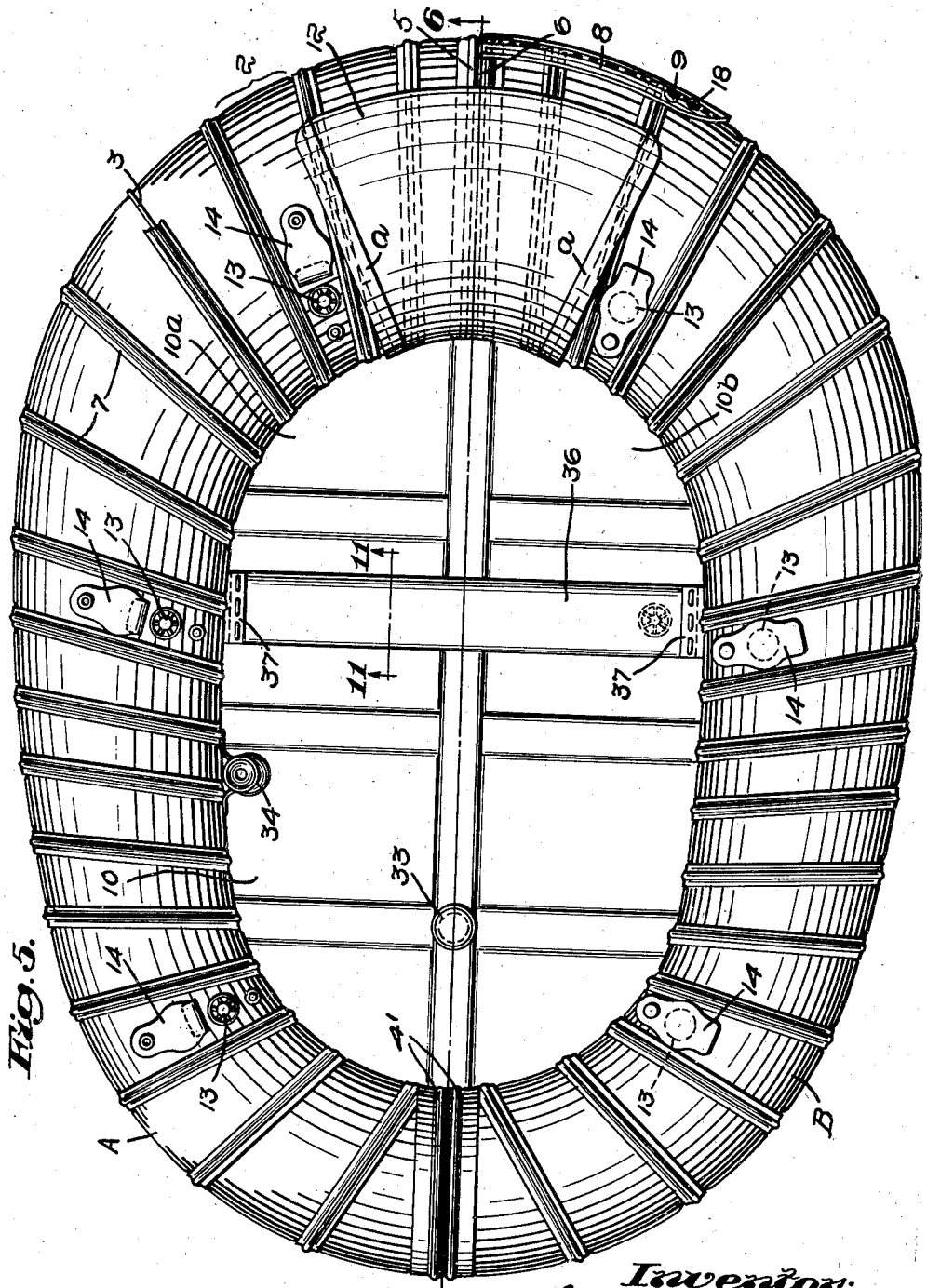

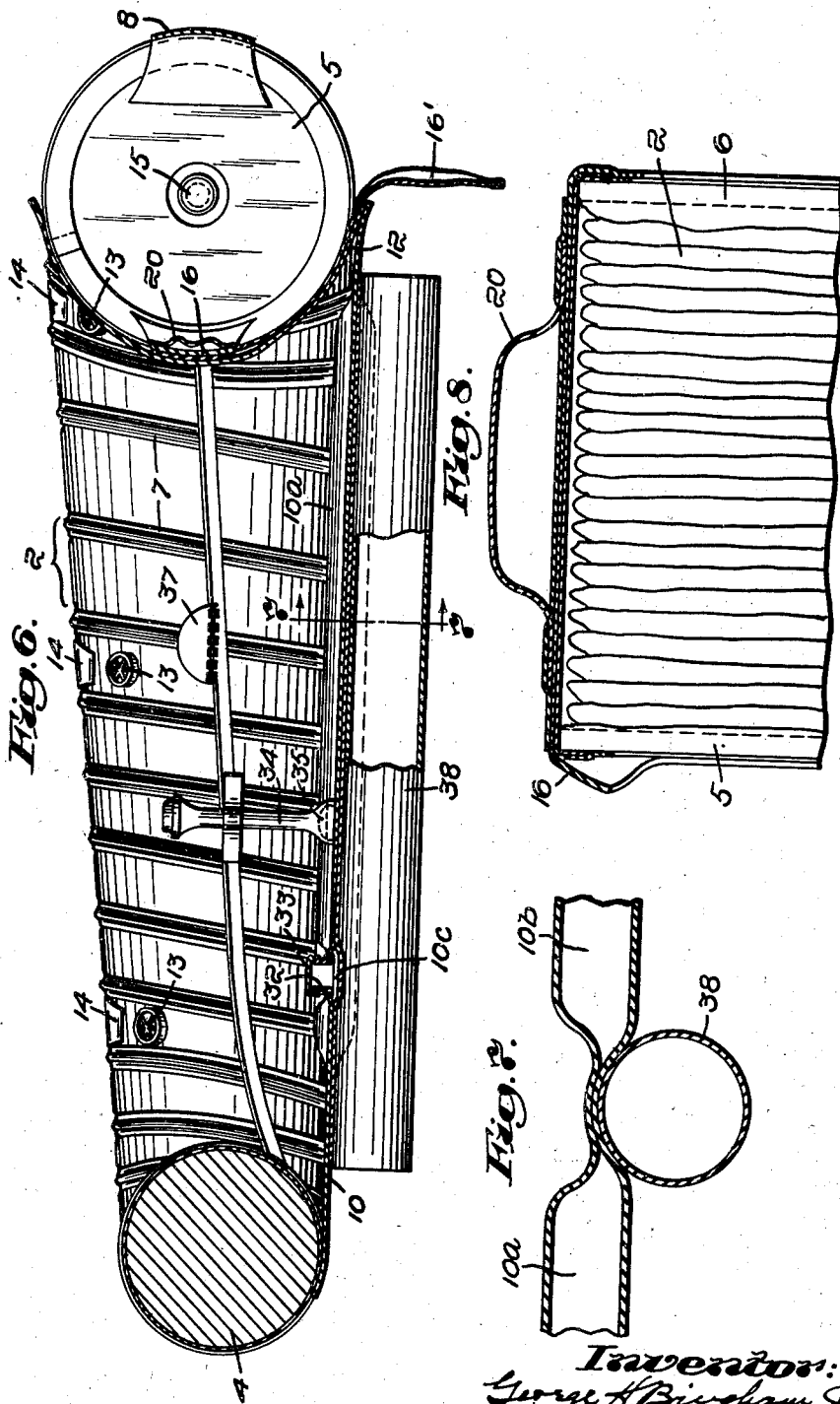

June 3, 1947.   G. H. BINGHAM, JR   2,421,679
LIFESAVING BOAT
Filed May 1, 1944   6 Sheets-Sheet 4
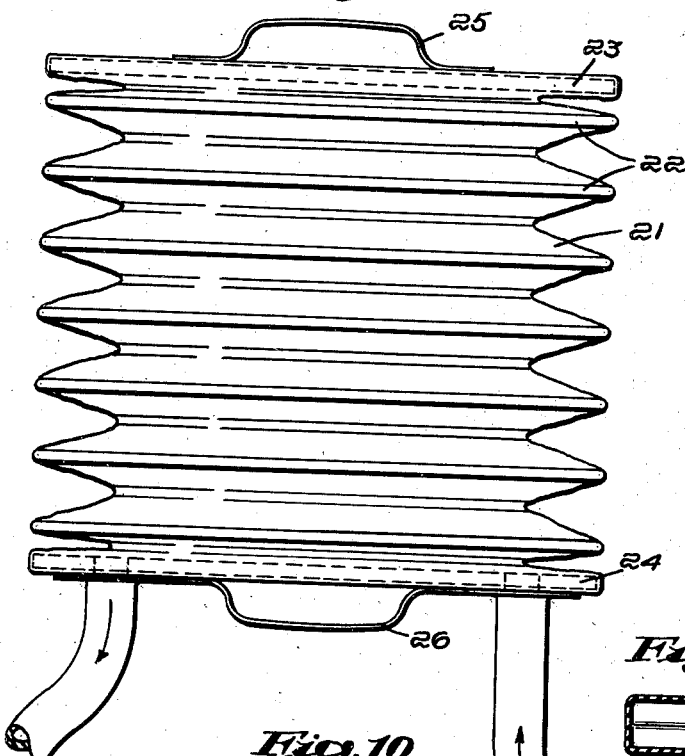
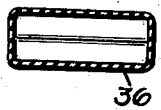
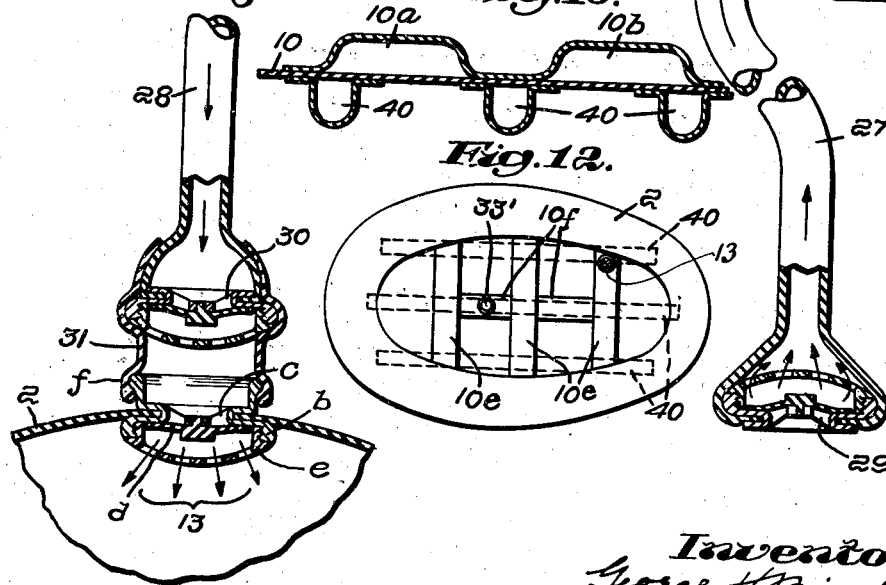

June 3, 1947.  G. H. BINGHAM, JR  2,421,679
LIFESAVING BOAT
Filed May 1, 1944  6 Sheets-Sheet 5
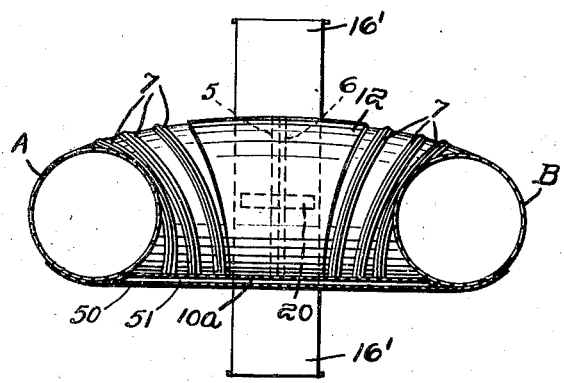
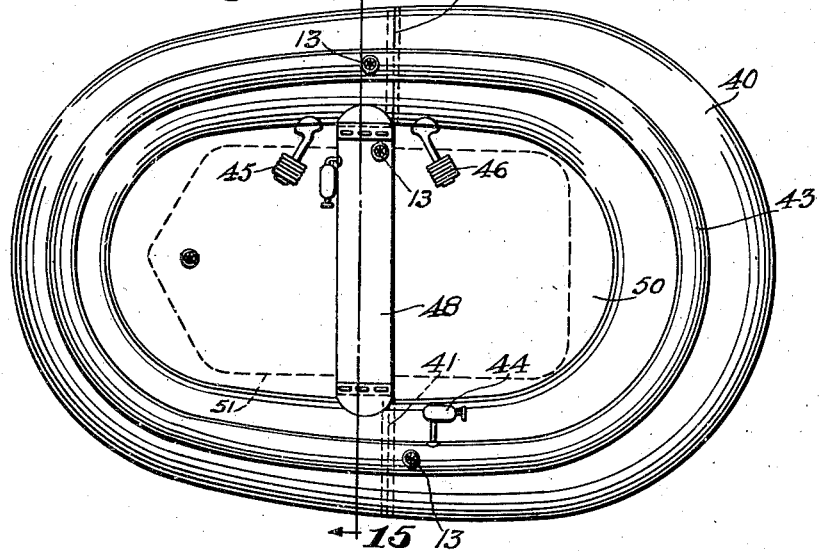
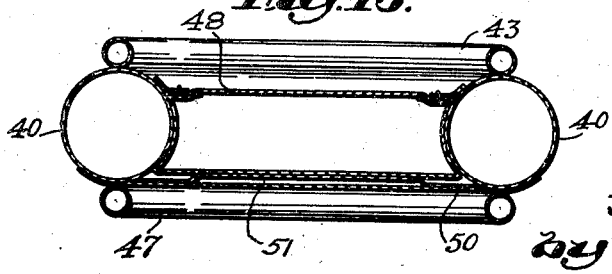
Inventor:
George H. Bingham Jr.,
by J. H. Murady,
Attorney.

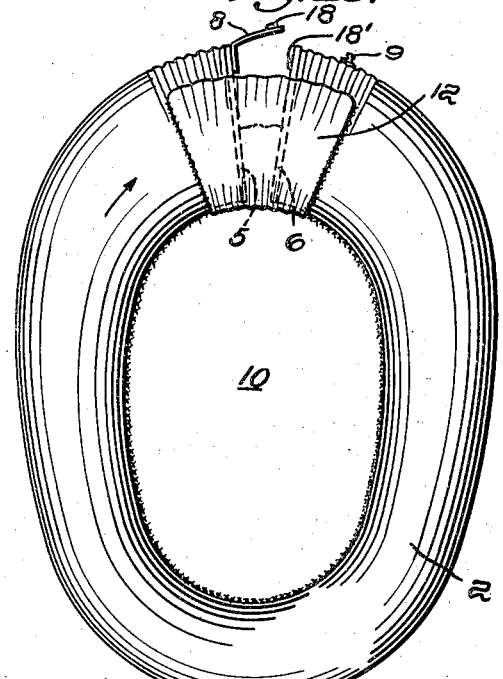
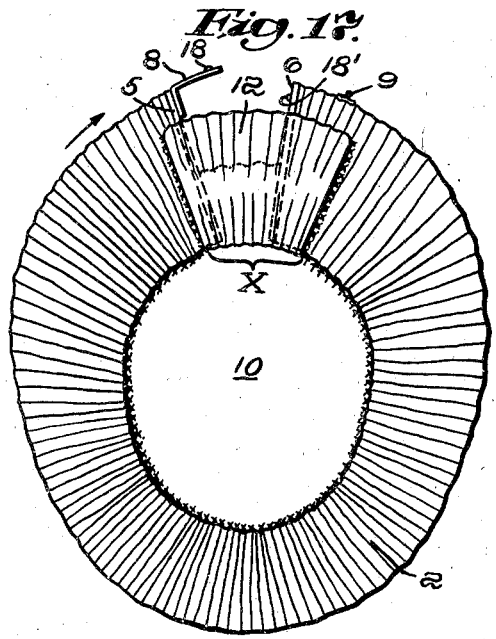
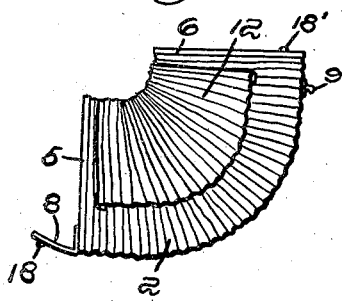
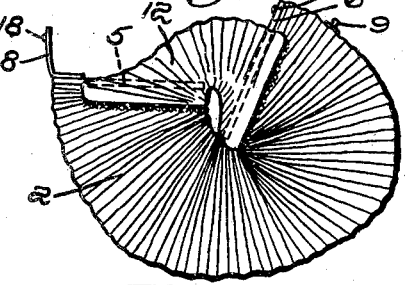
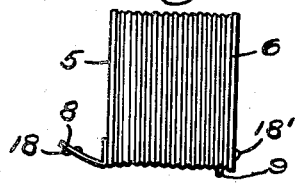

Patented June 3, 1947

2,421,679

UNITED STATES PATENT OFFICE 2,421,679

LIFESAVING BOAT

George H. Bingham, Jr., Lincoln, Mass., assignor to The Cambridge Rubber Company, Cambridge, Mass., a corporation of Maryland Application May 1, 1944, Serial No. 533,463

15 Claims. (Cl. 9—2)

This invention relates to inflatable boats of the general type much used, for example, by the United States Navy for life-saving purposes, making landings, and the like.

The invention aims to improve boats of the character just mentioned with the object, among others, of accomplishing the following results:

One: To improve their safety. Many lives have been lost in the Service during this war by boats of this type being sunk by rifle and machine-gun fire, thus making it an easy matter for the enemy to pick off the men who are left swimming in the water. This invention provides a construction which is far more difficult to sink and which, therefore, greatly reduces the loss of life from the cause just mentioned.

Two: To speed up the operations of inflating and launching an inflatable boat. In prior constructions these boats have customarily been inflated either manually or, more frequently, by releasing compressed charges of carbon dioxide into them. These operations consume precious time which the present invention saves by making the operation of inflation practically independent of manual labor and of any supply of extraneous gas, and effecting the inflating operation practically automatically.

Three: To reduce the storage space required by boats of this type. On ship-board space must always be economized, and this invention aims to devise an inflatable boat which can be collapsed and folded into a small, compact package occupying only a very small fraction of the space which the boat takes when inflated and in which, moreover, it will be better protected, while at the same time being exceptionally convenient to handle.

Four: To increase the buoyancy and stability of boats of this type.

The foregoing and other objects of the invention will be readily understood from the following description when read in connection with the accompanying drawings, and the novel features will be particularly pointed out in the appended claims.

In the drawings,

Fig. 5 is a plan view of the boat when fully inflated;

Fig. 6 is a sectional view on the line 6—6, Fig. 5, with the seat omitted;

Fig. 7 is a sectional view on the line 7—7, Fig. 6;

Fig. 8 is a sectional view on the line 8—8, Fig. 1;

Fig. 9 is a side elevation, with some parts broken away, showing a novel form of pump with which the boat illustrated in Fig. 5 preferably is equipped;

Fig. 10 is a fragmentary sectional view of a modified form of bottom construction for the cockpit of the boat;

Fig. 11 is a vertical, transverse, sectional view on the line 11—11, Fig. 5;

Fig. 12 is a plan view indicating another form which some features of the invention may take.

Fig. 13 is a vertical, sectional view through the boat shown in Fig. 5 looking toward the right-hand end of said figure and illustrating the cover 16 pulled out from under the flap 12;

Fig. 14 is a plan view, somewhat diagrammatic in character, illustrating a modification;

Fig. 15 is a vertical, sectional view on the line 15—15, Fig. 14;

Fig. 16 is a plan view of the boat immediately after the initial collapsing step, namely that of releasing the strap 8 from the snap fastener element 9;

Figs. 17, 18, 19 and 20 are similar views showing successive steps in this collapsing operation; and Fig. 21 is an end view of the boat in its inflated condition and just before the strap 8 has been released or unfastened.

Figure 1:
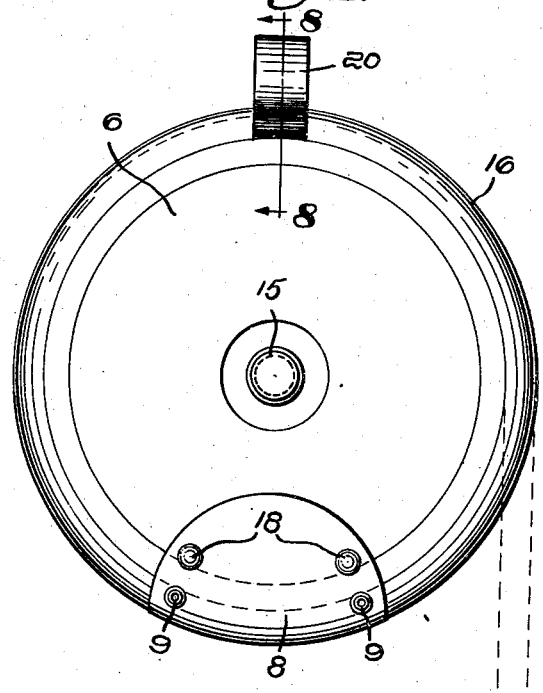
Figs. 1 and 2 are end and side views, respectively, of an inflatable boat embodying this invention when packaged for storage, shipment, or other handling.

Referring first to Figs. 5 and 6, the construction there shown comprises a tubular body 2 encircling a cockpit. This particular body is made in two sections, indicated at A and B, respectively, these sections being permanently connected together at the left-hand end of the boat and releasably connected together at the opposite end. Each section thus has the form of one-half of a tubular ellipse, the walls of the section consisting of rubberized fabric, or equivalent waterproof material, vulcanized in the form shown, and the tubes being circular in cross-sectional form. Each section is reinforced by a coiled spring 3 having an inherent tendency to expand and the coils gradually increasing in size from the smaller end to the larger end. At their smaller ends both coils are connected to heads or disks of solid material, such as water-resistant fiber board, plywood, metal, or the like, one of these heads being shown at 4 in Fig. 6, and the two being connected side by side at 4', as shown in Fig. 5. At their opposite ends they are also connected to similar heads 5 and 6, respectively. These springs may be located either inside or outside the waterproof covering or envelope but, in the construction shown, they are outside, and they are secured to the rubber walls by reinforcing strips of tape 7 which cover the springs and are vulcanized to the body fabric or sheet material.

An end strap 8 secured permanently to the head 5 of section A is fastened by snaps, one of which is shown at 9 in Fig. 5, to the outer wall of the section B and fastens the free ends 5 and 6 of the two sections together when the boat is inflated. The cooperating elements for the snap fastener 9 are on the inner surface of the strap 8. The cockpit bottom or floor 10 is vulcanized at its margin to the lower surfaces of the tubular body, except for a short distance adjacent to the end disks 5 and 6, but in this region it is vulcanized to the lower margin of a flap 12 which extends about half-way around the inner sides of the end portions of the sections A and B adjacent to their free ends 5 and 6. The opposite lateral edges a—a, Fig. 5, of this flap are vulcanized to the body fabric or covering of the sections, but between these edges the flap is free of attachment to the tubular body.

Several air-intake valves or check valves 13 are located in the body 2, three for each section being shown in Fig. 5. They are of the same general type as the check valves that have been used to a considerable extent in other apparatus, such as gas masks, and one of these valves is shown more in detail in Fig. 9. It comprises a body b fitting into an aperture in the boat body 2 and having an air-tight connection with the edges of said aperture, this body being provided with an integral grid c, to the center of which is secured a valve disk d. A guard e of rigid material is threaded into the body b and is made of reticulated form so that it provides ample space for the passage of air therethrough. The valve disk d, however, is made of rubber, or some equivalent waterproof material, and is so biased that it normally rests in the position shown in Fig. 9 with its margin against the portion of the body b surrounding the aperture and, therefore, closing the aperture. While this is the normal position, the valve will readily open inwardly when the atmospheric pressure acting on the outer face of it materially exceeds that on the inner surface.

It will be evident that with this construction, and bearing in mind the fact that the cockpit bottom 10 is of flexible material, this boat may readily be collapsed by unfastening the strap 8, Fig. 5, so as to allow the heads 5 and 6 to separate, and then, working from one end, for example, the head 5, progressively squeezing one of the coils or turns of the spring 3 as closely as possible to the next larger one. As this operation proceeds, a few inches of the length of the boat are gathered at a time, and the gathered portions are squeezed toward the head from which the operator is working. This action is indicated in Fig. 16 by the arrow. It should be noted that the flap 12 is vulcanized at its lateral edges to the body (but not at its ends 5 or 6) and along lines spaced backwardly from the heads, as indicated by the small crosses in Figs. 16 to 19. Also, that the bottom 10 is vulcanized to the body, except in the region indicated by the bracket X in Fig. 17, but that in this area it is vulcanized to the flap 12. Consequently, the heads cannot be separated by any large distance.

As successive coils of the spring are forced toward each other and are brought up as closely to the head 5 as possible, the entire circumferential extent of the body 2 is gradually reduced. This effect is indicated somewhat diagrammatically by the successive Figures 17, 18 and 19, it being practically impossible to illustrate exactly the successive positions of all the parts. As this operation progresses, the bottom 10, being very flexible, is buckled up and pushed to one side in loose folds where it does not interfere with the collapsing of the tubular body portion. Also, some swinging movement of the head 5 relatively to its companion head 6 takes place during this time, as shown in Figs. 18 and 19. As this operation further continues, the body finally is gathered into folds approximately parallel with each other, and the head 5 comes around into substantially a parallel relationship to the head 6, the entire body portion being disposed in approximately the form of a cylinder, as shown in Fig. 20. In order to release the air in the body and thus allow this collapsing operation to proceed more rapidly, each of the heads 5 and 6 is provided with a central opening normally closed by a screw-threaded cap 15, and these caps should be removed before it is attempted to collapse the boat. With this done, however, the trapped air in the body escapes freely through these end vents and the collapsing operation should be continued until the disk 5, moving in a general direction along the axis of the spring 3, is brought around to a short distance away from the head 6. During this operation the entire length of the tubular body section is gradually shortened, and the intervening body fabric of the boat is folded between the adjacent turns or coils of the spring. While the stack is held firmly compressed, the end of the strap 8, carrying the snap fastener element 18, is brought across the end of this stack and its free end is pulled over on to the head 6 where these elements 18 are snapped on to the corresponding buttons 18', Fig. 20, on the outer surface of the head. The opposite end of this strap 8 is vulcanized to the head 5, as shown in Fig. 6, and it cooperates with the portion of the flap 12 at the inner edge of the boat body to fasten the entire body section in its collapsed condition. In this condition a strap or rope may be passed around the bundle so formed to hold it collapsed against the tension or pressure of the springs.

Figure 2:
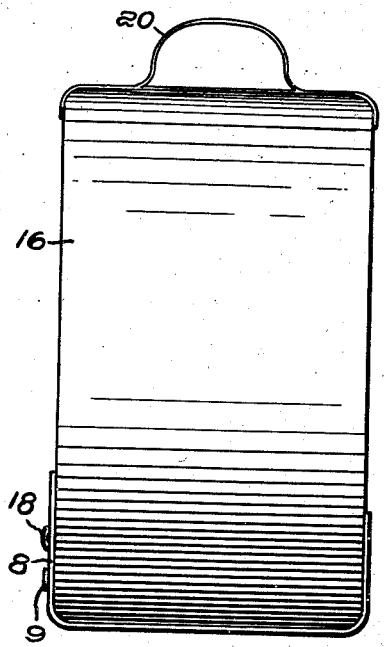
Figure 3:
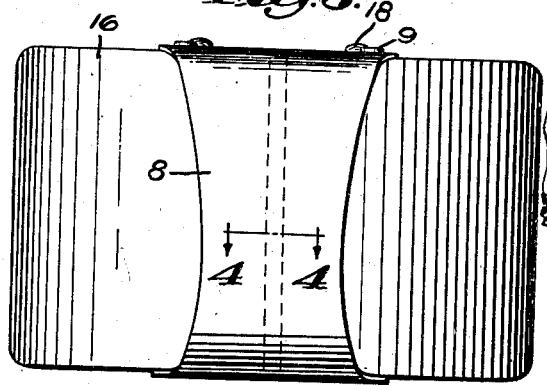
Fig. 3 is a bottom view of the construction shown in Figs. 1 and 2.
Figure 4:
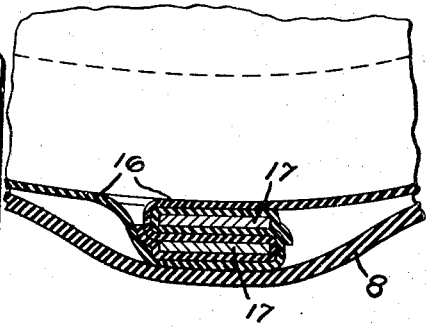
Fig. 4 is a sectional view on the line 4—4, Fig. 3.

As above explained, the flap 12 is not attached to the body 2 except at its lateral edges, and the exposed surfaces of the stack just mentioned consist chiefly of sections of the body fabric. In order to cover and protect them, and at the same time to provide a neater and more compact package, a cover section 16 is vulcanized at its middle area to the middle of the flap 12, preferably under the handle 20, as indicated in Figs. 6 and 13. One end 16', Fig. 6, of this flap normally hangs down below the bottom of the boat, while the other end lies between the upper portion of the flap 12 and the adjacent portion of the body 2. Fig. 13 shows the cover pulled out. When, however, the boat has been collapsed into the generally cylindrical form above described, then both sections of the cover 16 can be pulled around the circumference of this cylindrical mass. Each end of the cover is folded and vulcanized around a reinforcing strip of metal 17 to strengthen and stiffen it, and these two ends are brought together at one side of the cylinder and folded, one around the other, as best shown in Fig. 4. The strap 8 next is stretched across these folded and reinforced ends 17—17, and the fasteners 18 which it carries are snapped over cooperating buttons on the head 6. This locks the cover 16 securely in its operative position where it encloses the fabric of the body 2 and cooperates with the end disks or heads 5 and 6 to make a very neat, compact package. Since the diameter of this package is controlled fundamentally by the diameter of the springs, the package will be of approximately the same diameter and its height usually will be somewhat larger than that diameter but not differing greatly unless the bottom of the cockpit is made in some of the forms hereinafter described which naturally will increase the total bulk to be packaged. Preferably the opposite margins of the cover 16 are either molded slightly to fit around the edges of the heads 5 and 6 snugly, as shown in Figs. 1 and 2, or else they may have sufficient elasticity so that they naturally assume this form. Preferably, also, a handle 20, Figs. 1, 2 and 6, is vulcanized to the flap 12 for convenience in handling the package.

In launching the boat, the fastening strap or stay strap 8 is simply un-snapped and the boat is tossed into the water. Or, if it is thrown in with the strap fastened, it will float for a considerable length of time because of air trapped in it. When unfastened it will immediately begin to open, due to the action of the coiled spring or springs in the body, and they will substantially complete the opening movement. During the expansion of the body, air will be taken in through the check valves 13 so that by the time the springs have completely expanded, which may take anywhere from fifteen to thirty seconds, and need not be longer than the lower figure if the boat is properly designed, a swimmer reaching the boat can then climb in over one end. If the boat is intended to hold more people they can all climb into it at that time. The body 2, however, is not inflated as fully as it can be, and in order to top off or complete the inflation, the men can either blow through the valves 13 or, more desirably, they can use the pump shown in Fig. 9.

This pump consists of a collapsible bellows 21 preferably provided with stiffening rings 22 and having firm disk-like heads 23 and 24. Attached to these heads are handles 25 and 26. Operatively secured to one of the heads are two flexible pipes or lengths of hose 27 and 28 and the ends of these pipes are enlarged and equipped with check valves 29 and 30 which may be like that shown at 13 in Fig. 9, the two valves being located in reversed relationship, however, so that one—in this case the valve 29—operates as an inlet valve, while the other is an exhaust or outlet valve. Also, the end of the outlet pipe 28 is equipped with a rubber fitting 31 adapted to snap over the nipple f with which the valve 13 is equipped. Preferably the same construction is used on the other valves 13 so that the pump can be removed from any valve to which it is fastened and applied to any other. Since, however, there are only two sections in this boat, it is merely necessary to shift it from one section to another. Such a pump, however, even if of relatively small size, say six inches in diameter and eight or ten inches long, when expanded, can be operated by one man to pump a suprisingly large volume of air in a short time. The pump is intended to be fastened to the boat, as by means of a chain or rope, so that it will be a permanent part of it; will be folded up inside of it; and cannot be separated from it but can be used in any one of several locations. For example, the same pump can be used effectively as a bilge pump.

At some stage in the launching operation after one or more of the occupants have climbed aboard, the flap 8 should be fastened, and the cover flaps 14 for the respective intake valves 13 should be folded over these valves and snapped in place, each flap being equipped with a snap fastener for this purpose.

Additional buoyancy and insulation preferably is given to the boat by making the bottom structure of a hollow form so that it can be inflated. For this purpose the entire bottom 10 is made with upper and lower walls except along the margin adjacent to the region where it is secured to the body 2. These areas are left of a single ply only since too large a bulk of material in this marginal area would interfere with the collapsing operation. As best shown in Fig. 7 the construction provides two longitudinally extending fluid chambers 10a and 10b separated throughout most of their length by a strip in which the bottom and top plies are vulcanized together. The two chambers are connected near the left-hand end, Figs. 5 and 6, by a cross chamber 10c in which is located an externally screw-threaded nipple 32 normally closed by a screw-threaded cover 33. This is intended primarily as an outlet, but the bottom also is equipped with an elongated inlet tube 34, the upper end of which is shaped like the nipple f, Fig. 9, of the inlet valve 13, so that the rubber fitting 31 of the pump 21 will fit over it. At the bottom of this tube is a check valve 35 like the check valve 13.

Consequently, the cockpit bottom can be inflated by the pump 21, and the air so forced into it will be locked in it by the valve 35. At the same time the air can be released whenever desired by removing the cover 33. This inflatable bottom is of advantage not only in providing additional buoyancy, when that is desired, but it also affords a container which can be used to store drinking water, or water for stabilizing purposes. The water can be pumped out, whenever desired, by using the pump 21, inserting the intake end 27 through the nipple 32.

In climbing into the boat when it is not fully inflated, there is always a tendency to pull the sides inwardly toward the cockpit. It is desirable, therefore, although not absolutely necessary, to stiffen the boat against such tendency to transverse buckling. Inflation of the bottom 10 produces a substantial degree of such stability. The boat may, however, be equipped with an inflatable seat 36, Figs. 5 and 11, extending across the cockpit from one side thereof to the other, and releasably secured to opposite sides by providing the latter with flaps 37—37, to which the ends of the seat may be lashed. In this position it acts, when fully inflated, as a transverse strut, and thus exerts a very substantial stabilizing effect. Also, it can be used as a container for drinking water, if desired.

In smaller boats of this type, as for example a one-man or two-man boat, there is a tendency for the boat to tip over if one of the occupants sits down on one side of it. There is also considerable tendency for it to be capsized by the waves. Both these tendencies can be reduced by filling the bottom chambers 10a and 10b with water, as above described, and also by providing the bottom with a collapsible keel which will automatically fill with water. Such a construction is shown at 38 in Figs. 6 and 7. This numeral designates a rubber tube having sufficient resiliency to hold itself normally in a tubular form but still being flexible. It is vulcanized to the bottom 10 of the boat where it fills with water immediately after the boat is launched. It therefore holds a considerable weight at the bottom of the boat which, while not rigid with the boat, nevertheless tends to counteract transient forces exerting a lateral tipping action on the boat. In addition, it serves as a keel.

This feature may be embodied in other forms as, for example, that shown in Fig. 10, where collapsible keel sections 40 are vulcanized to the bottom 10 of the cockpit, and the number and shape of these elements so used may be made anything desired within the limits of the design to which they are applied. Preferably they extend lengthwise of the boat and exert the steadying influence of a keel of corresponding dimensions. These are useful whether or not the bottom 10 has air chambers 10a and 10b, as shown in Fig. 10.

While the boat illustrated in Figs. 5 and 6 is of the one-man type, it is obvious that the invention can be embodied in a boat of any other desired capacity. Also, that it can be equipped with other appurtenances than those shown which are often used on boats of this type, such, for example, as an inflatable rail, hand ropes running around the sides, compartments for food, fishing tackle, emergency repair equipment, and the like.

Additional transverse stiffness can be given to the boat by running the air chambers crosswise of the bottom instead of lengthwise thereof. Such an arrangement is illustrated in Fig. 12 in which the bottom of the cockpit is provided with transversely extending air chambers 10e, all connected together by lengthwise ducts 10f so that they can all be inflated through the check valve 13 and deflated, when desired, through the exhaust valve 33', like that shown at 33 in Fig. 6. The pump 22 can be fitted on to the valve 13 in the manner shown in Fig. 9.

The length of time occupied in expanding the boat may be materially reduced and additional safety may be gained by modifying the construction above described, as illustrated in Figs. 14 and 15. Here the main body 40 of the boat may be of the same general construction as illustrated in Figs. 5 and 6, although it is not essential that this particular structure be used, but the details of this form of the invention have been omitted from Figs. 14 and 15 for purposes of simplicity. It is preferable, however, in this construction to make the body 40 in at least two chambers. For this reason it is shown in Fig. 14 as provided with a partition 41, and with headers similar to those shown at 5 and 6 in the construction above described, which permit separation of the sections at 42 to facilitate folding of the boat. An important feature of this modification, however, is the fact that it includes a supplemental tube 43 which is vulcanized to the upper surface of the tubular body 40. It extends along said body, preferably entirely around the cockpit and, as shown, its axis is substantially centered vertically with reference to the axis of the main body 40. The tube is continuous, no break being necessary at the joint 42, and it is equipped with one or more valves 13, Fig. 14, by means of which it may be inflated manually. Preferably, however, a small compressed air or carbon dioxide tank 44 is connected to this supplemental tube and is relied upon to inflate it initially.

In using this boat it is either inflated before being thrown overboard, or not, as desired, but, in either event, the strap 8 is released and substantially simultaneously therewith, the valve for the unit 44 is opened. This discharges gas under pressure into the auxiliary tube 43 which cooperates with the coiled spring 3 to expand the entire boat, with the result that that operation is completed sufficiently for flotation purposes within a fraction of a minute. Thereafter the tube 43 assists in maintaining the boat in its expanded condition, even under adverse circumstances, such as a puncture of the main body of the boat; it adds to the buoyancy of the latter, and it materially increase the free board, or, in other words, it acts as a splash rail or gunwale. It thus contributes both to the safety of the occupants and to their comfort.

Preferably this boat is equipped with hand pumps 45 and 46, Fig. 14, attached to the two sections, these two pumps being essentially like that shown in Fig. 9, but equipped with one hose only, the second valve being mounted at the end of the bellows to which the second hose would be connected, if one were used. Also, each of these pumps preferably is detachably connected to the tubular body 40 through a valve 13 so that either can be removed and attached to any one of the oher valves 13 for manually blowing up or increasing the pressure in any of the other units.

It will sometimes be found advantageous, also, to equip this boat with a second auxiliary tube 47, like the tube 43, as shown in Fig. 15, where it is vulcanized to the bottom of the body 40. It gives added depth, steadiness and buoyancy to the boat, and it may be connected with an expansion unit, like that shown at 44, so as to be blown up and kept inflated from the cockpit. Preferably the three tubes 40, 43 and 47 must be independently inflated.

There is an advantage, also, in making the seat or strut 48, which corresponds to that shown at 36 in Fig. 5, so that its ends abut firmly against the inner surfaces of the opposite walls of the body 40, where by bearing against these surfaces adjacent to the cockpit floor 50, they tend to hold this floor stretched, as well as to resist effectually any lateral collapsing action of the boat. This strut preferably is made as a separate unit so that it can be used for other purposes, when desired, such as to hold drinking water, supplies, or to act as a separate float, if need be.

It will readily be appreciated that these boats are exceptionally safe. A very considerable number of bullet holes through the upper part of one of them will not cause it to sink. Furthermore, those holes easily reached can quickly be patched with the emergency repair equipment that is customarily carried in boats of this type. In addition, if a bullet hole should go vertically or diagonally through both those parts of the wall above and below the bottom, it would take in water only rather slowly, and if the top hole was patched quickly, then the intake of water would be substantially stopped. The ability to expand itself automatically is an extremely important advantage in the practical use of boats of this type in times of emergency.

The facility with which these boats can be collapsed, folded, and packed into a compact package for handling and storing, is also a very important practical advantage. In addition to producing the movement essential to the automatic inflation of the boat, the spiral springs 3 also act as protecting elements for the fabric surfaces of the tubular sections, and they permit the manufacture of these parts of the boat from lighter weight material without sacrificing any degree of security in the construction of these tubular members.

All the air valves preferably are made such that the units to which they are connected can be inflated manually, by compressed air or gas, by mouth, or by manual expansion of such units. In the latter event, however, it is usually necessary to top off the inflation by means of a pump, such as one of those shown.

This spring expanding construction also eliminates the necessity for carrying carbon dioxide inflating equipment for the main body of the boat. While the particular boat illustrated is substantially flat, in practice both the bow and the stern usually are given an upward sweep.

In some inflatable floating structures, such as life rafts, boats, and the like, one or more supplemental or expander tubes, such as that shown at 43, may be used solely to expand the main body of the float, the spring being omitted. However, it is preferable to use in such a construction some means, such as hoops, or the like, for affording lateral support to the walls of the float. In a construction of this nature if the body of the float is provided with an air intake opening, the act of expanding it will partially inflate it, after which said opening may be closed by a cap, or the opening may consist of a check valve. Thus a small supplemental tube may be utilized to expand a relatively large float sufficiently so that nothing more than a topping off of the pressure in it would be required, and the expanding operation thus may be performed with a relatively small carbon dioxide or compressed air container, or with the expenditure of little manual energy. Under emergency conditions this is a very important advantage.

While I have herein shown and described a typical embodiment of my invention, it will be evident that the invention is susceptible of embodiment in other forms without departing from the spirit or scope thereof.

Having thus described my invention, what I desire to claim as new is:

1. An inflatable boat comprising a tubular body substantially encircling a cockpit, and spring means in said body serving to expand it automatically, said body having one or more check valves in the wall thereof normally closed but adapted to open inward automatically under external atmospheric pressure when a small degree of vacuum is created inside the body by the expansion thereof and to close automatically whenever the pressure in said body is about equal to or higher than that outside of it.

2. An inflatable boat according to preceding claim 1, in which said spring means includes one or more coiled springs serving to hold the body expanded, said body being collapsible lengthwise of said spring or springs into a compact form, and means for holding it in its collapsed condition.

3. An inflatable boat according to preceding claim 1, in which said body comprises sections permanently connected together end to end except at two ends, and means for connecting the latter ends of said sections together, said means being releasable and the body being collapsible when the latter ends are released.

4. An inflatable boat comprising a tubular body substantially encircling a cockpit, one or more coiled springs in said body for expanding it both laterally and longitudinally, and one or more check valves in the wall of said body through which air is drawn to inflate it as it is so expanded.

5. An inflatable boat comprising a tubular body substantially encircling a cockpit, one or more coiled springs in said body for expanding it both laterally and longitudinally and one or more check valves in the wall of said body through which air is drawn to inflate it as it is so expanded, and additional means operable to release the air freely to collapse the body, said boat being foldable, when collapsed, into a compact package.

6. An inflatable boat according to preceding claim 4, in which said spring or springs taper so that during the folding of the boat one coil will tend to nest within another.

7. An inflatable boat according to preceding claim 4, in which said body includes independent sections separately inflatable and arranged end to end, leaving two ends free, means for releasably connecting said free ends whereby, when they are disconnected, the boat may be collapsed and folded into a compact package, and additional means operable to release the air freely from said body to permit such collapse.

8. An inflatable boat according to preceding claim 4, in combination with additional means operable to force more air in to some part of said boat.

9. An inflatable boat according to preceding claim 4, in combination with a collapsible pump connected with one of said valves to produce a higher degree of inflation in said body.

10. An inflatable boat according to preceding claim 1, in which said spring means includes one or more coiled springs serving to hold the body expanded, said body being collapsible lengthwise of said spring or springs into a compact form, and a cover secured to said body and adapted to enclose the side walls of said body when the latter is collapsed.

11. An inflatable boat comprising a tubular inflatable body substantially encircling a cockpit, a floor for said cockpit cooperating with said body to exclude water from the cockpit, and two supplemental inflatable tubes extending along the top and bottom surfaces, respectively, of said tubular body and increasing the vertical dimensions of the assembly relied upon for buoyancy.

12. An inflatable float comprising a tubular body and a flexible tube extending lengthwise of said body and secured thereto whereby the inflation of said tube will also extend said body, and means for laterally supporting the walls of said body, said body having an air intake opening whereby extension of it by said tube will at least partially inflate said body, and a closure for said opening.

13. An inflatable boat comprising a tubular inflatable body substantially encircling a cockpit, a bottom for said cockpit, and a collapsible tubular keel for said boat extending longitudinally of the boat along the lower side of said bottom for the greater part of the length of said bottom and open at both ends, said tubular keel being normally held open by its own resiliency.

14. An inflatable boat comprising a tubular inflatable body substantially encircling a cockpit, said body having reinforcing elements maintaining it in said tubular form but said body being flexible longitudinally and having two ends, separable but normally connected together to complete the encirclement of said cockpit, and means for releasably fastening said ends together whereby, when said ends are released from each other, said body may be folded along its own axis into a compact package.

15. An inflatable boat comprising a tubular inflatable body substantially encircling a cockpit, said body having reinforcing elements serving normally to maintain the tubular form of the body, one or more check valves in the wall of said body through which air is drawn to inflate it when the body is expanded, said body being longitudinally flexible, a bottom for said cockpit cooperating with said body to exclude the water from the cockpit, a supplemental tube secured to the outer surface of said tubular body and also substantially encircling said cockpit where it serves, when inflated, to exert an expanding action on said body, and means operable automatically to inflate said supplemental tube.

GEORGE H. BINGHAM, JR.

REFERENCES CITED

The following references are of record in the file of this patent:

UNITED STATES PATENTS

| Number | Name | Date |
| --- | --- | --- |
| 2,334,072 | Cooper | Nov. 9, 1943 |
| 2,021,156 | Smith | Nov. 19, 1935 |
| 1,570,470 | Fritsche, et al | Jan. 19, 1926 |
| 1,671,874 | Rawlings | May 29, 1928 |
| 2,223,625 | Krupp | Dec. 3, 1940 |
| 2,367,835 | Kreyer | Jan. 23, 1945 |
| 2,370,069 | Patten | Feb. 20, 1945 |

FOREIGN PATENTS

| Number | Country | Date |
| --- | --- | --- |
| 170,356 | Great Britain | Oct. 14, 1921 |
| 461,608 | Germany | June 25, 1928 |
| 135,859 | Germany | Nov. 11, 1902 |
| 614,162 | Germany | Oct. 26, 1936 |

OTHER REFERENCES

"Scientific American" Magazine, front cover and article titled "Parachute Boat" on pages 178 and 179 of October, 1942 issue. (Copy available in Div. 61, class 9-2.1.)